United States Patent [19]

Averbuch et al.

[11] Patent Number: 5,726,764
[45] Date of Patent: Mar. 10, 1998

[54] APPARATUS AND METHOD FOR PROVIDING DATA AND FACSIMILE SERVICES IN A RF COMMUNICATION SYSTEM

[75] Inventors: Rod Averbuch, Buffalo Grove; Timothy J. Wilson, Schaumburg, both of Ill.

[73] Assignee: Motorola, Inc., Schaumburg, Ill.

[21] Appl. No.: 385,237

[22] Filed: Feb. 8, 1995

Related U.S. Application Data

[63] Continuation of Ser. No. 95,325, Jul. 21, 1993, abandoned.

[51] Int. Cl.⁶ .................... H04N 1/00; H04M 11/00
[52] U.S. Cl. .................... 358/403; 358/407; 379/59; 379/100; 455/33.1; 455/54.1
[58] Field of Search .................... 358/400, 401, 358/403, 405, 407; 379/58, 59, 61, 93, 100; 455/33.1, 66, 54.1

[56] References Cited

U.S. PATENT DOCUMENTS

| | | | |
|---|---|---|---|
| 4,933,770 | 6/1990 | DeSpain | 358/400 |
| 4,991,201 | 2/1991 | Tseng | 379/58 |
| 5,200,991 | 4/1993 | Motoyanagi | 379/61 |
| 5,263,078 | 11/1993 | Takahashi et al. | 379/58 |

*Primary Examiner*—Thomas D. Lee
*Attorney, Agent, or Firm*—Richard A. Sonnentag

[57] ABSTRACT

A new data circuit equipment (DCE) coupled to an IWF and a terminal adapter (TA) coupled to a mobile station provide interconnection within a RF communication system such that Class 2 service common to wireline network equipment can be beneficially employed in the wireless RF communication system. The new DCE and TA are transparent to external wireline systems while maintaining compatibility with, inter alia, the predetermined data service protocol layers of the RF communication system, the RF air-interface and/or radio link protocol (RLP) of the RF communication system.

21 Claims, 2 Drawing Sheets

APPARATUS AND METHOD FOR PROVIDING DATA AND FACSIMILE SERVICES IN A RF COMMUNICATION SYSTEM

This is a continuation of application Ser. No. 08/095,325, filed Jul. 21, 1993 and now abandoned.

FIELD OF THE INVENTION

The invention relates generally to data and facsimile service in communication system and more particularly to providing data and facsimile service in a RF communication system.

BACKGROUND OF THE INVENTION

The use of fixed (stationary) facsimile devices for the transmission of image data through the PSTN (Public Switched Telephone Network) environment is known. Such fixed facsimile devices adhere to a set of protocol standards specifically designed for use in the relatively low error and low delay environment of the PSTN. In particular, one protocol specifies the manner in which the digitally represented control data is handled; another protocol specifies the manner in which the digitally represented image data is handled.

The use of analog RF communication systems, operably coupled to the PSTN, for the transmission of facsimile data between fixed facsimile devices and mobile facsimile devices is also known. Such systems use the analog RF communication system as an extension of the PSTN environment; the modem signals generated by facsimile devices and transmitted within the PSTN are also transmitted through the voiceband path of the analog RF communication system. Naturally, modem signals transmitted in such a manner are also subject to the noise and fading conditions inherent in any type of RF communication system. Thus, just as a voice message through such a system may be corrupted, the digital facsimile data represented by modem signals may also be corrupted, leading to poor recreation of the transmitted image.

Digital RF communication systems offer an alternative for the transmission of facsimile data. While such systems are also susceptible to the noise and fading conditions present in other RF communication systems, they are capable of offering protection against errors in the digital information in the form of error correction codes. The amount of error protection offered is limited in part by the available data bandwidth of such a system. Also, digital RF communication systems typically present larger delays to the transmission of message data than might be found in analog communication systems. Typically, the addition of error correction protocol only add to this delay.

While many digital RF communication systems are currently evolving, the Groupe Special Mobile (GSM) Pan-European Digital Cellular (PEDC) system has had functional requirements specified since the late 1980's. As a consequence of such specifications (labeled by GSM as Recommendations), manufacturers of hardware have had an opportunity, and have, fixed hardware designs to meet the functional requirements specified in the GSM Recommendations. Typical types of hardware designed to meet the specifications of the GSM Recommendations include mobile stations, fixed-site base-stations, maintenance and switching centers (MSCs), and data interfaces, or interworking functions (IWFs). These hardware designs utilize predetermined data service protocol layers likewise defined in corresponding GSM Recommendations.

Attempts have been made to incorporate the protocol standards used within the PSTN directly into fixed designs of such digital RF communication systems. For example, it was thought that a typical facsimile interface, for example a Class 2 interface, could simply be moved from a Class 2 modem housed in an IWF of GSM to a mobile station on the other end of the wireless air-interface of GSM. It has been determined, however, that such an approach is less than satisfactory at producing acceptable image reproduction for facsimile. In particular, the PSTN-based image data transfer protocol is particularly sensitive to errors incurred over the air-interface; a single error can destroy an entire scan line within the image data. Error correction techniques can be used to ensure the integrity of the image data. However, such techniques often produce delays that violate timing parameters specified by the PSTN-based control data transfer protocol. For example, GSM Recommendation 3.45, which specifies the transmission of facsimile data within GSM, was found to produce unacceptable image quality. The subsequent GSM Recommendation 3.46 is extremely complex and timing sensitive, as well as non-transparent to the facsimile devices used.

Thus a need exists for a apparatus and method to provide data and facsimile services in digital RF communication systems while maintaining compatibility with the fixed designs of the digital RF communication systems.

DETAILED DESCRIPTION OF A PREFERRED EMBODIMENT

A new data circuit equipment (DCE) coupled to an IWF and a terminal adapter (TA) coupled to a mobile station provide interconnection such that Class 2 service can be implemented in digital RF communication systems while maintaining compatibility with the predetermined data service protocol layers of the system. In addition, the interconnection provides data and facsimile services in the digital RF communication system while being transparent to the air-interface, or radio link protocol (RLP), of the system. The DCE and TA allow an in-band protocol (including RLP) for Class 2 protocol reconstruction while also providing a real time and/or "store and forward" Class 2 solution.

Figure 1:
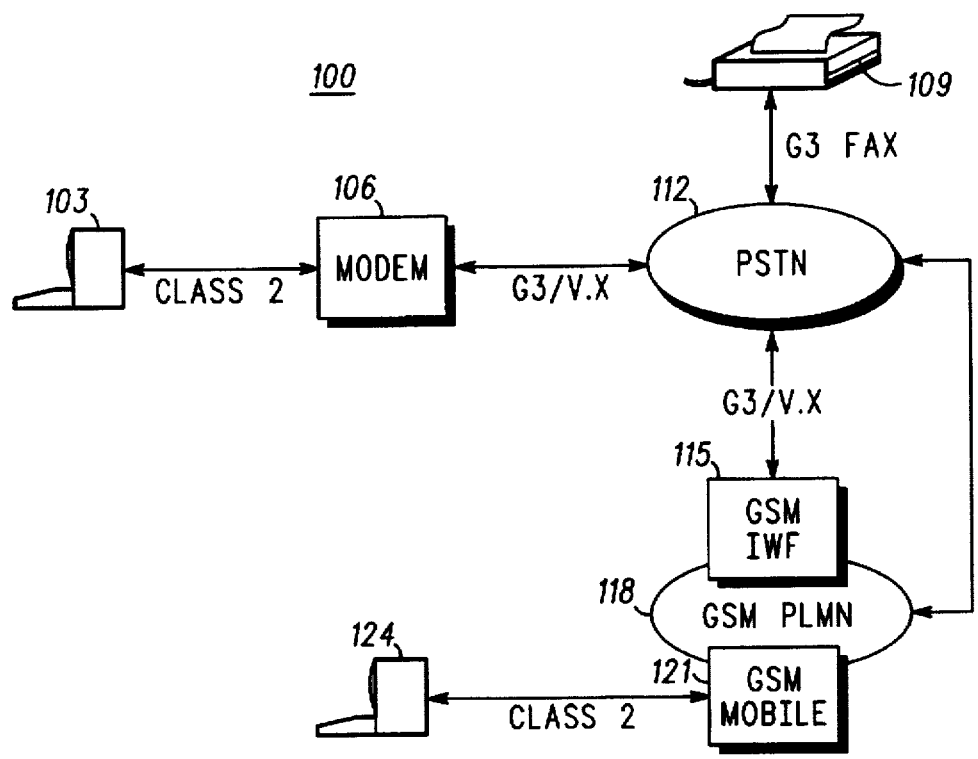
FIG. 1 generally depicts a prior art digital RF communication system for implementing data and facsimile services.

FIG. 1 generally depicts a prior art communication system for implementation of data and facsimile service. As depicted in FIG. 1, a terminal 103 is coupled to a public switched telephone network 112 via a modem 106. Terminal 103 may implement a facsimile card and corresponding software to provide facsimile capabilities. In the preferred embodiment, terminal 103 can be any suitable personal computer (PC). Also coupled to PSTN 112 is a facsimile device 109, which likewise provides facsimile capability. PSTN 112 is coupled to a GSM interworking function (IWF 115 which acts as a data interface for data and facsimile services provided by, for example, PC 103 and facsimile device 109). GSM IWF 115 is coupled to a GSM mobile 121 via the GSM public land mobile network (PLMN) 118. GSM mobile 121 is coupled to a PC 124 which would be capable of receiving any data or facsimile transmission provided outside PSTN 112. A facsimile device similar to device 109 may also be coupled to GSM mobile 121.

As previously stated, it was thought that Class 2 modems in GSM IWF 115 could simply be moved across GSM PLMN 118 and placed into GSM mobile 121 to extend data and facsimile services to the digital RF communication system. However, the Class 2 protocol used in PSTN-based image data transfer is highly susceptible to errors produced by GSM PLMN 118. To reduce errors in the GSM PLMN 118, the basic GSM RLP for error protection can be implemented, but implementation of RLP only amplifies the problem of long delays due to potential re-transmission of certain information received in error. Consequently, T30 timers as specified in GSM recommendation 3.46 tend to expire due to the RLP delay. Therefore, while this technique is viable on its face, it does not provide a workable solution to providing data and facsimile services in a digital RF communication system.

Figure 2:
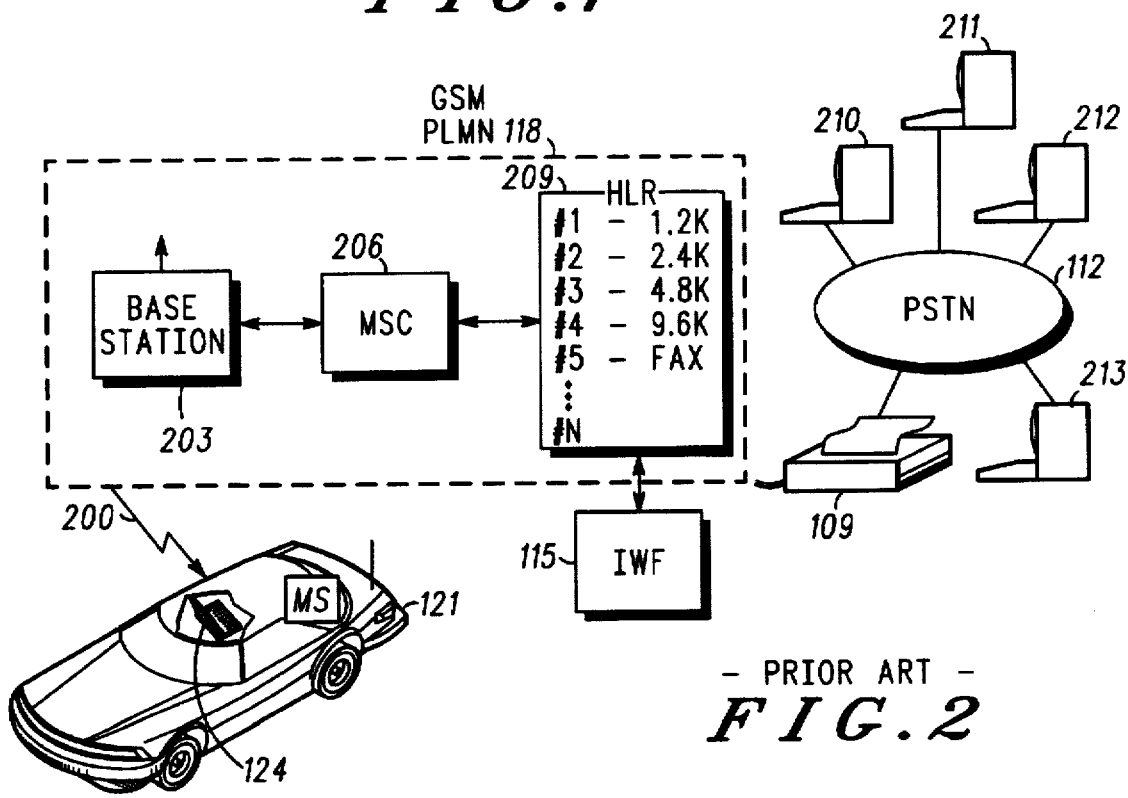
FIG. 2 depicts in further detail the digital RF communication system of FIG. 1.

FIG. 2 depicts in further detail the digital RF communication system 100 of FIG. 1. As shown in FIG. 2, a plurality of terminals 210–213, each transmitting data at a different rate, may be connected to PSTN 112. Although not shown, the connection of terminals 210–213 to PSTN 112 would be via a modem similar to modem 106. As shown in FIG. 2, GSM PLMN 118 includes, inter alia, a base station 203, a maintenance and switching center (MSC) 206 and a home location register (HLR) 209. HLR 209 is typically utilized to store information regarding users of a "home" network, but also provides switching inputs to MSC 206 regarding the rate of data being transferred and the type of data (i.e., modem data or facsimile data) being provided.

Within HLR 209, each data rate service, and also the facsimile service, has its own PSTN number as it is associated with one mobile station user. When transferring data or facsimile information from base station 203 to mobile station 121 (downlink), PSTN 112 must determine the rate of transmission and dial the appropriate number to HLR 209 for proper switching connection in MSC 206. Once connected, information from one of terminals 210–213, or facsimile device 109, can be appropriately routed to base station 203 through an IWF modem or FAX circuit (not shown) for transmission over an air-interface (via signal 200) to mobile station 121. For a transmission from mobile station 121 to base station 203 (uplink), the mobile station user must have knowledge of the called modem rate and mode and must therefor specify this information to mobile station 121. This information is transferred via signal 200 to base station 203, routed to MSC 206 which appropriately switches, based on the called modem rate and mode information, to a proper modem in the IWF and for appropriate routing to one of terminals 210–213 connected to PSTN 112.

Figure 3:
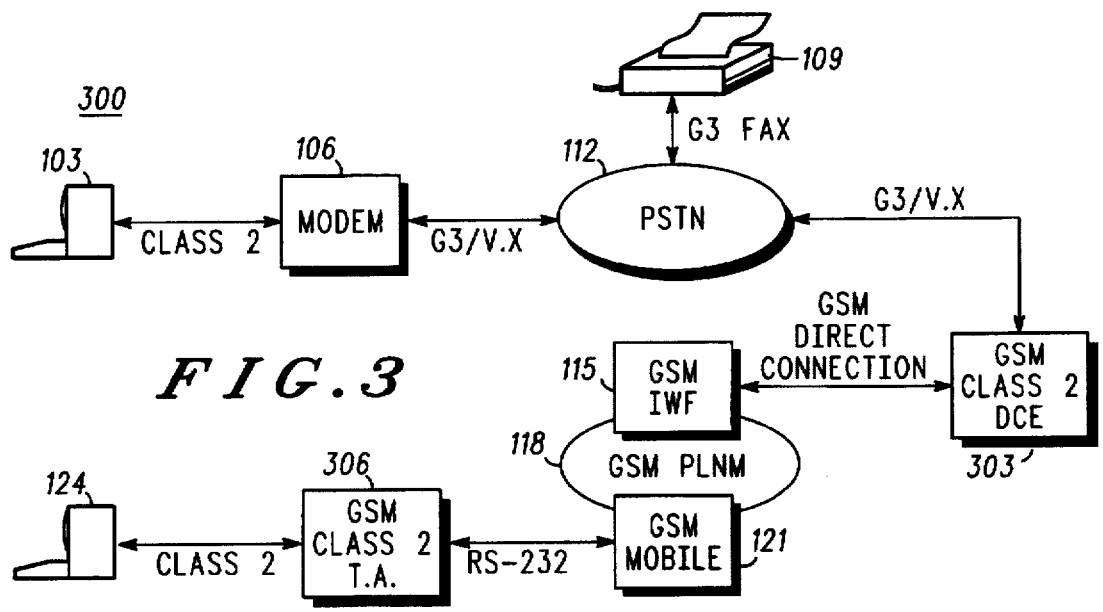
FIG. 3 depicts a digital RF communication system 300 in accordance with the invention.

FIG. 3 depicts a digital RF communication system 300 in accordance with the invention. As depicted in FIG. 2, a GSM Class 2 data circuit equipment (DCE) 303 is connected between PSTN 112 and GSM IWF 115. Also, a GSM Class 2 terminal adapter (TA) 306 is connected between GSM mobile 121 and terminal 124. Addition of DCE 303 and TA 306 leverage off the availability of a GSM direct connection port provided by manufacturers of GSM IWF 115 and an RS-232 port provided by manufacturers of GSM mobile 121. Addition of DCE 303 is transparent to the Group 3 FAX (G3) and V.X modem protocols (where X is any CCITT protocol, for example V.21, V.22, V.22bis, V.32, etc.) utilized by PSTN 112, as is the addition of TA 306 to terminal 124. In other words, PSTN 112 and terminal 124, after connection of DCE 303 and TA 306, do not realize the system has been configured differently, and can thus still utilize the standard Class 2 protocol as they normally would in typical wireline configurations.

As previously mentioned, GSM recommendations specify pre-determined data service protocol layers. An example of these layers are: Layer 1—GSM rate adaptation and FEC for different transmission rates; Layer 2—GSM radio link protocol (RLP); and Layer 3—GSM call processing. With reference to FIG. 3, Layer 1 and Layer 2 functions are typically performed in GSM IWF 115 and GSM Mobile 121 while Layer 3 functions are performed in MSC 206 and GSM mobile 121. The GSM recommendations that specify Layer 1, Layer 2 and Layer 3 functionality are given in GSM recommendations 4.21, 4.22, and 4.08 respectively.

In a typical configuration of GSM IWF 115, with reference to FIG. 1, a Class 2 modem (not shown in GSM IWF 115) would accept information from the Group 3 FAX and V.X modem protocol (G3/V.X), demodulate that information, and provide the demodulated information to the RLP Layer 2 function. Layer 1 rate adaptation an FEC would occur for each of the different rates as depicted in FIG. 2, however, referring to FIG. 3, GSM IWF 115 is also fitted with a GSM direct connection port, which in the preferred embodiment is a RS 232 port which is well known in the art. This direct connect port bypasses the modems housed within GSM IWF 115, and is input directly into the RLP Layer 2 function. The invention leverages off the GSM direct connect port by allowing DCE 303 to have an RS 232 input/output on the GSM end and a G3/V.X input/output on the PSTN 112 end. Likewise, TA 306 can leverage off a RS-232 input/output of a GSM mobile 121 and can also implement a Class 2 input/output on a terminal 124 on the side of GSM mobile 121.

Figure 4:
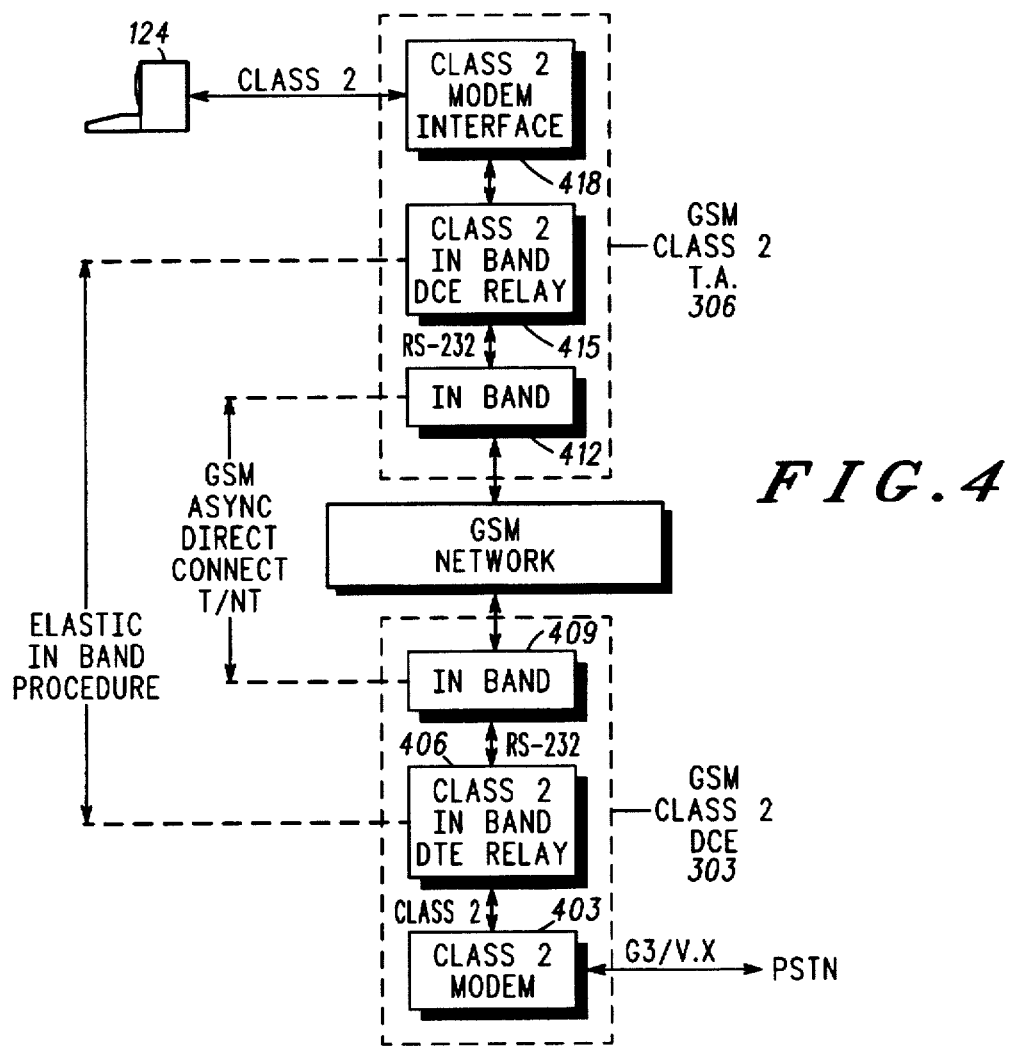
FIG. 4 generally depicts, in block diagram form, data circuit equipment (DCE) and terminal adapter (TA) in accordance with the invention.

FIG. 4 generally depicts, in block diagram form, DCE 303 and TA 306 in accordance with the invention. DCE 303 is generally comprised of a Class 2 modem which accepts the Class 2 protocol from PSTN 112. Class 2 modem 403 is coupled to a Class 2 in-band data terminal equipment (DTE) relay 400 which converts output from Class 2 modem 403 into the standard format of RS-232. Inband block 409 provides in-band signaling functions related to the rate and mode of transmission by, for example, terminals 210–213 and facsimile device 109. Output from in-band block 409 is sent to the GSM network, which is generally comprised of GSM IWF 115, GSM PLMN 118 and GSM mobile 121. In-band block 412 within TA 306 processes the in-band signaling related to transmission rate and mode and provides that information to Class 2 in-band DCE relay 415 with TA 306. DCE relay 415 converts the information from the standard RS-232 format to a fixed format for Class 2 modem interface 418 to transmit, via the Class 2 protocol, that information to terminal 124. A similar procedure is utilized for transmission in the opposite direction. One such approach to in-band signaling is described in the instant assignee's pending U.S. application Ser. No. 07/993,992 filed on Dec. 21, 1992, entitled "Facsimile Transmission in a RF Digital Communication System," invented by Timothy J. Wilson and Nimrod Averbuch, and incorporated herein by reference.

As stated above, communication between DCE 303 and TA 306 is via in-band signaling. One advantage of in-band signaling is the elimination of the multiple subscriber numbers in the HLR 209 of FIG. 2. The PSTN Class 2 procedure enables the Class 2 modem within DCE 303 to check the remote modem capability by monitoring the different tones that are specific for different CCITT standard modulation rates and schemes and also the Group 3 facsimile format. Sending a Class 2 protocol command, for example FAA=1, in-band (by this time, the 3 Layers in GSM have already been assigned to a single mode) from terminal 124 coupled to GSM mobile 121 will eventually translated by GSM Class 2 DCE 303 (transparent to GSM IWF 115) to a FAA=1 command towards the Class 2 modem of GSM Class 2 DCE 303. After the Class 2 modem in DCE 303 makes the corresponding connection it will respond with an in-band message (transparent to the 3 Layers in GSM) of "FCON" for facsimile or "CONNECT" which includes the speed of the remote modem. Consequently, the only number required to be specified for all facsimile and modem (data) services is one GSM service number, which is a GSM asynchronous 9.6 kbps direct connect in the preferred embodiment, for all types of incoming, mobile terminated, calls. For outgoing, mobile originated, calls, the in-band procedure allows communication between the GSM Class 2 DTE relay 406 and GSM Class 2 DCE relay 415 which allows the modem to adapt itself to the remote data modem or FAX, and report "FCON" or "CONNECT" to terminal 124 coupled to GSM mobile 121 via the in-band signaling. Consequently, the requirement to notify the system of the outgoing data speed, as stated above, is eliminated.

While the invention has been particularly shown and described with reference to a particular embodiment, it will be understood by those skilled in the art that various changes in form and details may be made therein without departing from the spirit and scope of the invention. For example, in alternate embodiments, DCE 303 and TA 306 may not only be coupled to the direct connect port of a GSM IWF 115 and an RS-232 port of GSM mobile 121 respectively (as depicted in the preferred embodiment), but one or both may be incorporated in GSM IWF 115 and GSM mobile 121 respectively. Incorporation of DCE 303 into GSM IWF 115 would define a new type of GSM Class 2 modem and in-band protocol gateway in the GSM IWF 115. In addition, while the preferred embodiment has been shown as the GSM digital RF communication system, other systems utilizing certain portions of the GSM standards may beneficially employ the present invention. Such networks include, but are not limited to, the satellite-based cellular radiotelephone system "Iridium" and personal communication systems/ personal communication networks (PCS/PCN) networks based upon GSM standards but at a higher frequency (for example, 1.8 GHz). Still other systems not based on the GSM standards, but requiring a similar type solution, could also beneficially employ the present invention.

What we claim is:

1. An apparatus for providing data and facsimile services in a digital cellular RF communication system, the digital cellular RF communication system providing data services via predetermined data service protocol layers, the apparatus comprising:

means for accepting data transmitted by equipment of a wireline network in a fixed format utilized by the wireline network;

means for converting the data from the fixed format to a standard format via in-band signaling that is transparent to the predetermined data service protocol layers of the digital cellular RF communication system to produce converted data; and means for transmitting the converted data in the standard format such that transmission of the converted data is compatible with receivers of the digital cellular RF communication system.

2. The apparatus of claim 1 wherein the fixed format further comprises a Group 3 FAX or V.X modem format.

3. The apparatus of claim 2 wherein the means for accepting data further comprises a Class 2 modem.

4. The apparatus of claim 1 wherein the standard format utilized by equipment of the RF communication system further comprises a RS-232 format.

5. The apparatus of claim 1 further comprising:

means for receiving converted data in a standard format;

means for re-converting the converted data in the standard format utilized by equipment of the RF communication system to a fixed format utilized by the wireline network; and means for transmitting the re-converted data in the fixed format to equipment of the wireline network.

6. The apparatus of claim 5 wherein equipment of the RF communication system further comprises an interworking function (IWF) or a mobile station.

7. The apparatus of claim 6 wherein the apparatus is either coupled to said IWF or the mobile station or is incorporated into the IWF or the mobile station.

8. The apparatus of claim 5 wherein equipment of the wireline network further comprise a terminal device or a facsimile device.

9. An apparatus for providing multi-rate data services and facsimile services in a digital RF communication system, the digital RF communication system providing data services via predetermined data service protocol layers, the apparatus comprising:

means for accepting multi-rate data and facsimile data transmitted by equipment of a wireline network in a fixed format utilized by the wireline network;

means for converting the data from the fixed format to a standard format via in-band signaling that is transparent to the predetermined data service protocol layers of the digital RF communication system to produce converted data; and means for transmitting the converted data in the standard format such that transmission of the convened data is compatible with receivers of the digital RF communication system.

10. The apparatus of claim 9 wherein the fixed format further comprises a Group 3 FAX or V.X modem format.

11. The apparatus of claim 9 wherein said predetermined data service protocol layers further comprise at least one of the predetermined data service protocol layers from the group of predetermined data service protocol layers consisting of: rate adaptation and FEC for different transmission rates, radio link protocol (RLP), and call processing.

12. The apparatus of claim 9 further comprising:

means for receiving converted data in a standard format;

means for re-converting the converted data in the standard format utilized by equipment of the digital RF communication system to a fixed format utilized by the wireline network; and means for transmitting the re-converted data in the fixed format to equipment of the wireline network.

13. The apparatus of claim 12 wherein a digital RF communication system further comprises the Groupe Special Mobile (GSM) digital RF communication system.

14. A method of providing data and facsimile services in a digital cellular RF communication system, the digital cellular RF communication system providing data services via predetermined data service protocol layers, the method comprising the steps of:

accepting data transmitted by equipment of a wireline network in a fixed format utilized by the wireline network;

converting the data from the fixed format to a standard format via in-band signaling that is transparent to the predetermined data service protocol layers of the digital cellular RF communication system to produce converted data; and transmitting the convened data in the standard format such that transmission of the converted data is compatible with receivers of the digital cellular RF communication system.

15. The method of claim 14 wherein the fixed format further comprises a Group 3 FAX or V.X modem format, the step of accepting data further comprises the step of accepting data via a Class 2 modem and wherein the standard format utilized by equipment of the RF communication system further comprises a RS-232 format.

16. The method of claim 14 further comprising the steps of:

receiving converted data in a standard format;

re-converting the converted data in the standard format utilized by equipment of the RF communication system to a fixed format utilized by the wireline network; and transmitting the re-converted data in the fixed format to equipment of the wireline network.

17. The method of claim 16 wherein equipment of the RF communication system further comprises an interworking function (IWF) or a mobile station and wherein equipment of the wireline network further comprises a terminal device or a facsimile device.

18. A method of providing multi-rate data services and facsimile services in a digital RF communication system, the digital RF communication system providing data services via predetermined data service protocol layers, the method comprising the steps of:

accepting multi-rate data and facsimile data transmitted by equipment of a wireline network in a fixed format utilized by the wireline network;

converting the data from the fixed format to a standard format via in-band signaling that is transparent to the predetermined data service protocol layers of the digital RF communication system to produce converted data; and transmitting the convened data in the standard format such that transmission of the convened data is compatible with receivers of the digital RF communication system.

19. The method of claim 18 wherein the fixed format further comprises a Group 3 FAX or V.X modem format and wherein said predetermined data service protocol layers further comprise at least one of the predetermined data service protocol layers from the group of predetermined data service protocol layers consisting of: rate adaptation and FEC for different transmission rates, radio link protocol (RLP), and call processing.

20. The method of claim 18 further comprising the steps of:

receiving converted data in a standard format;

re-converting the converted data in the standard format utilized by equipment of the digital RF communication system to a fixed format utilized by the wireline network; and transmitting the re-converted data in the fixed format to equipment of the wireline network.

21. The method of claim 20 wherein a digital RF communication system further comprises the Groupe Special Mobile (GSM) digital RF communication system.

* * * * *

UNITED STATES PATENT AND TRADEMARK OFFICE
CERTIFICATE OF CORRECTION

PATENT NO. : 5,726,764
DATED : March 10, 1998
INVENTOR(S) : Averbuch, et al.

It is certified that error appears in the above-indentified patent and that said Letters Patent is hereby corrected as shown below:

Column 8, line 9 reads "convened data" should be --converted data--.

Signed and Sealed this

Twenty-first Day of July, 1998

Attest:

BRUCE LEHMAN

Attesting Officer    Commissioner of Patents and Trademarks